US012777490B2

(12) United States Patent
He et al.

(10) Patent No.: US 12,777,490 B2
(45) Date of Patent: Oct. 27, 2026

(54) REPORTING SUPPORTED COMPONENT CARRIERS FOR PHYSICAL DOWNLINK CONTROL CHANNEL MONITORING CAPABILITIES

(71) Applicant: Apple Inc., Cupertino, CA (US)

(72) Inventors: Hong He, San Jose, CA (US); Chunhai Yao, Beijing (CN); Dawei Zhang, Saratoga, CA (US); Fangli Xu, Beijing (CN); Haitong Sun, Cupertino, CA (US); Jie Cui, San Jose, CA (US); Oghenekome Oteri, San Diego, CA (US); Wei Zeng, Saratoga, CA (US); Weidong Yang, San Diego, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 603 days.

(21) Appl. No.: 17/998,181

(22) PCT Filed: Jun. 3, 2020

(86) PCT No.: PCT/CN2020/094182
§ 371 (c)(1),
(2) Date: Nov. 8, 2022

(87) PCT Pub. No.: WO2021/227152
PCT Pub. Date: Nov. 18, 2021

(65) Prior Publication Data

US 2023/0217453 A1 Jul. 6, 2023

(30) Foreign Application Priority Data

May 14, 2020 (WO) ................ PCT/CN2020/090266
May 14, 2020 (WO) ................ PCT/CN2020/090316

(51) Int. Cl.
*H04L 5/00* (2006.01)
*H04W 72/23* (2023.01)

(52) U.S. Cl.
CPC ............ *H04W 72/23* (2023.01); *H04L 5/001* (2013.01)

(58) Field of Classification Search
CPC ............................... H04W 72/23; H04L 5/001
See application file for complete search history.

(56) References Cited

U.S. PATENT DOCUMENTS

2012/0320838 A1* 12/2012 Yang ..................... H04W 72/02
2013/0010964 A1 1/2013 Fong et al.
(Continued)

FOREIGN PATENT DOCUMENTS

CN 102823186 12/2012
CN 106375060 2/2017
(Continued)

OTHER PUBLICATIONS

Apple Inc., "Remaining Issues on PDCCH Enhancements for eURLLC", 3GPP TSG RAN WG1 #100bis, e-Meeting, R1-2002329, Apr. 11, 2020, 7 sheets.
(Continued)

*Primary Examiner* — Ronald B Abelson
(74) *Attorney, Agent, or Firm* — Fay Kaplun & Marcin, LLP

(57) ABSTRACT

A user equipment (UE) reports capabilities to a network. The UE receives a request from a network for radio access capabilities of the UE, determines one or more radio access capabilities related to a supported number of component carriers (CCs) for physical downlink control channel (PDCCH) monitoring by the UE, generates the message that includes the one or more radio access capabilities of the UE and transmits the message to the network.

18 Claims, 5 Drawing Sheets

(56) References Cited

U.S. PATENT DOCUMENTS

| | | | |
|---|---|---|---|
| 2017/0026941 A1 | 1/2017 | Su et al. | |
| 2018/0132282 A1 | 5/2018 | Ly et al. | |
| 2019/0150073 A1 | 5/2019 | Tiirola et al. | |
| 2019/0191360 A1 | 6/2019 | Sun et al. | |
| 2019/0246426 A1* | 8/2019 | Kim | H04W 72/20 |
| 2019/0349155 A1 | 11/2019 | Xu et al. | |
| 2021/0212075 A1* | 7/2021 | Hosseini | H04W 72/0453 |
| 2022/0225393 A1* | 7/2022 | Gao | H04L 5/0053 |
| 2023/0049505 A1* | 2/2023 | Takahashi | H04W 72/0446 |

FOREIGN PATENT DOCUMENTS

| | | |
|---|---|---|
| CN | 107113603 | 8/2017 |
| CN | 109802758 | 5/2019 |
| CN | 109892001 | 6/2019 |
| CN | 110620645 | 12/2019 |
| CN | 110651440 | 1/2020 |
| CN | 111052831 | 4/2020 |
| WO | 2011/132960 | 10/2011 |
| WO | 2020/032773 | 2/2020 |
| WO | 2020/072963 | 4/2020 |
| WO | 2021/163061 | 8/2021 |

OTHER PUBLICATIONS

3rd Generation Partnership Project; Technical Specification Group Radio Access Network; Evolved Universal Terrestrial Radio Access (E-UTRA); Radio Resource Control (RRC); Protocol Specification (Release 12), 3GPP TS 36.331, v12.9.0, Mar. 30, 2016, 456 sheets.

ZTE, "On PDCCH enhancements for NR URLLC", 3GPP TSG RAN WG1 #99, R1-1911963, Nov. 22, 2019, 15 sheets.

* cited by examiner

REPORTING SUPPORTED COMPONENT CARRIERS FOR PHYSICAL DOWNLINK CONTROL CHANNEL MONITORING CAPABILITIES

BACKGROUND

A user equipment (UE) may establish a connection to at least one of a multiple different networks or types of networks. To establish and/or maintain the network connection, the UE may provide capability information to the network. For example, the UE may report to the network various capabilities related to UE physical downlink control channel (PDCCH) monitoring. The network may then transmit downlink control information to the UE based on the reported UE PDCCH monitoring capabilities.

SUMMARY

Some exemplary embodiments are related to a method performed by a user equipment (UE). The method includes receiving a request from a network for radio access capabilities of the UE, determining one or more radio access capabilities related to a supported number of component carriers (CCs) for physical downlink control channel (PDCCH) monitoring by the UE, generating the message that includes the one or more radio access capabilities of the UE and transmitting the message to the network.

Other exemplary embodiments are related to a user equipment having a transceiver and a processor. The transceiver is configured to communicate with a network. The processor is configured to perform operations that include receiving a request from a network for radio access capabilities of the UE, determining one or more radio access capabilities related to a supported number of component carriers (CCs) for physical downlink control channel (PDCCH) monitoring by the UE, generating the message that includes the one or more radio access capabilities of the UE and transmitting the message to the network.

Still other exemplary embodiments are related to an integrated circuit. The integrated circuit has circuitry configured to receive a request from a network for radio access capabilities of a user equipment (UE), circuitry configured to determine one or more radio access capabilities related to a supported number of component carriers (CCs) for physical downlink control channel (PDCCH) monitoring by the UE, circuitry configured to generate the message that includes the one or more radio access capabilities of the UE and circuitry configured to transmit the message to the network.

DETAILED DESCRIPTION

Figure 1:
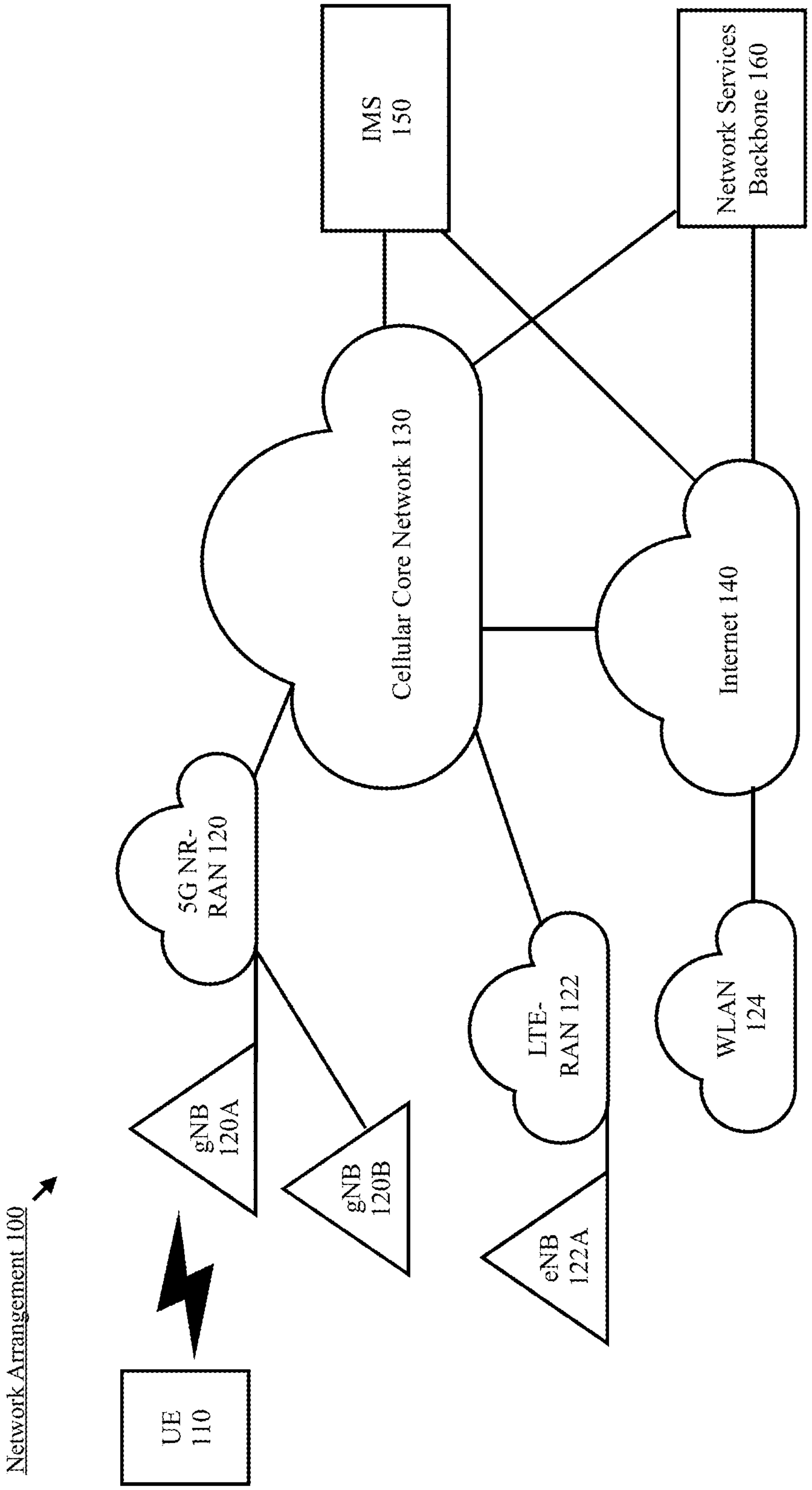
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) reporting UE physical downlink control channel (PDCCH) monitoring capabilities to the network.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

In addition, the exemplary embodiments are described with regard to a 5G New Radio (NR) cellular network. However, reference to a 5G NR network is merely provided for illustrative purposes. The exemplary embodiments may be utilized with any network that implements the functionalities described herein for UE capability reporting. Therefore, the 5G NR network as described herein may represent any network that includes the functionalities described herein for the 5G NR network.

The exemplary embodiments are further described with regard to the third generation partnership (3GPP) Specification Release 15 (hereinafter "Rel-15") and the 3GPP Specification Release 16 (hereinafter "Rel-16"). The examples provided below describe implementing exemplary techniques for reporting UE PDCCH monitoring capabilities within the context of Rel-15 and/or Rel-16 downlink control information signaling and PDCCH monitoring. Throughout this description, Rel-15 and Rel-16 may be characterized as set of distinct operating criteria. Thus, the term "first operating criteria" may refer to Rel-15 or Rel-16 and the term "second operating criteria" may also refer to Rel-15 or Rel-16. However, the exemplary embodiments are not limited to a scenario specific to Rel-15 or Rel-16 and may apply to any appropriate scenario. Accordingly, the exemplary embodiments may be used in conjunction with any current UE capability reporting techniques, future implementations of UE capability reporting techniques or independently from other UE capability reporting techniques.

FIG. 1 shows a network arrangement 100 according to various exemplary embodiments. The network arrangement 100 includes a UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.). Further details of the 5G NR-RAN 120 will be provided below.

The base stations (e.g., the gNB 120A, the gNB 120B, the eNB 122A) may include one or more communication interfaces to exchange data and/or information with camped UEs, the corresponding RAN, the cellular core network 130, the internet 140, etc. Those skilled in the art will understand that any association procedure may be performed for the UE 110 to connect to the 5G NR-RAN 120. For example, as discussed above, the 5G NR-RAN 120 may be associated with a particular cellular service provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5G NR-RAN 120). As mentioned above, the use of the 5G NR-RAN 120 is for illustrative purposes and any type of network may be used.

The use of a separate 5G NR-RAN 120 and LTE-RAN 122 is merely provided for illustrative purposes. An actual network arrangement may include a RAN that includes architecture that is capable of providing both 5G NR RAT and LTE RAT services. For example, a next-generations radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
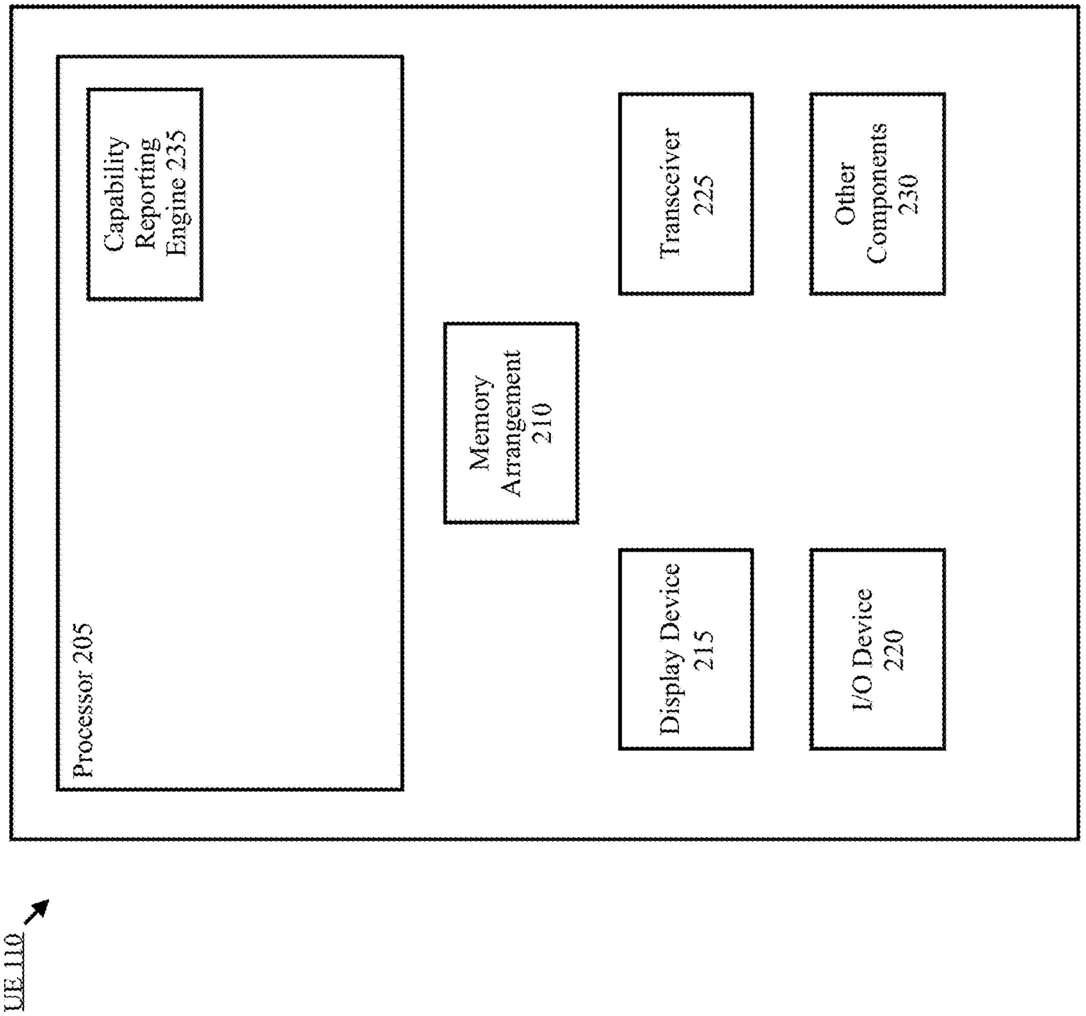
FIG. 2 shows an exemplary user equipment (UE) according to various exemplary embodiments.

FIG. 2 shows an exemplary user equipment (UE) 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, a SIM card, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include a capability reporting engine 235. The capability reporting engine 235 may perform various operations related to generating and transmitting UE capability information to the network. As mentioned above, the exemplary embodiments relate to reporting UE PDCCH monitoring capabilities.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 1120 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

As mentioned above, the exemplary embodiments are described with regard to PDCCH monitoring within the context of Rel-15 and/or Rel-16. The following description will provide a general overview of some of the Rel-15 and Rel-16 aspects of PDCCH monitoring that may be considered by the exemplary UE capability reporting mechanism described herein.

On the network side, downlink control information that is to be transmitted on the PDCCH to the UE 110 may be mapped to particular control channel elements (CCEs). However, a subframe may include downlink control information that is not relevant to the UE 110 and the UE 110 may not be aware of where the downlink control information intended for the UE 110 is located within the subframe. Accordingly, the UE 110 may be configured to the find downlink control information relevant to the UE 110 within the subframe by monitoring and blindly decoding a particular set of PDCCH candidates (e.g., a set of one or more consecutive CCEs on which PDDCH for the UE 110 may be mapped).

In Rel-15, a maximum number of monitored PDCCH candidates and non-overlapped CCEs were defined for PDCCH monitoring on a per slot basis. Different values are specified for different subcarrier spacing (SCS) configurations since the slot duration may vary per SCS configuration.

In addition, Rel-15 supports two types of PDCCH monitoring configurations, slot-based and span-based, that may be implemented at the UE 110. The span-based PDCCH monitoring configuration may relate to a type of span pattern. Those skilled in the art will understand that a span pattern relates to a time configuration within a slot for PDCCH monitoring on an active bandwidth part (BWP) of a serving cell.

Figure 3:
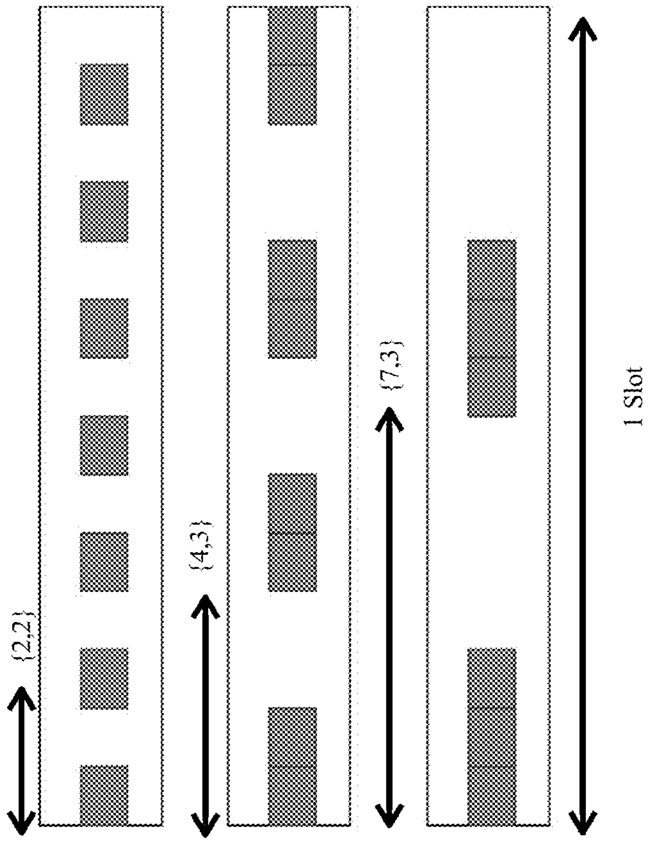
FIG. 3 illustrates three different span patterns relative to one slot.

A span pattern may be defined by a pair of number of symbols {X,Y}. X may represent a minimum number of consecutive symbols between first symbols of two PDCCH monitoring occasions in two respective consecutive span patterns. Y may represent the number of consecutive symbols for PDCCH monitoring occasions within X symbols, starting from the first symbol of X symbols. FIG. 3 illustrates three different span patterns relative to one slot. The three span patterns, {2,2}, {4,3}, {7,3}, are defined in Rel-15 and may be up to UE 110 implementation.

In Rel-16 PDCCH monitoring capabilities were enhanced to improve scheduling flexibility for ultra-reliable low latency (URLLC) use cases. This includes a maximum number of monitored PDCCH occasions and non-overlapped CCEs per span. Thus, there may be a different number of monitored PDCCH occasions and non-overlapped CCEs over a slot for different span configurations.

The above described aspects of Rel-15 and Rel-16 PDCCH monitoring may be applicable to scenario involving carrier aggregation (CA). Those skilled in the art will understand that CA relates to the UE 110 being configured with a plurality of component carriers (CCs). Each CC may represent a channel that facilitates communication between the UE and the network over a particular frequency band. A plurality of CCs may correspond to the same frequency band, each CC may correspond to a different band or a combination thereof. Further, each CC has a particular bandwidth, the more CCs the UE is configured with the more bandwidth that is available for communications with the network.

The exemplary embodiments relate to the UE 110 reporting its PDCCH monitoring capabilities to the network. In a first aspect, the exemplary embodiments include UE capability signaling for supported CC numbers with regard to PDCCH monitoring. In a second aspect, the exemplary embodiments include UE capability signaling for reduced PDCCH monitoring.

Figure 4:
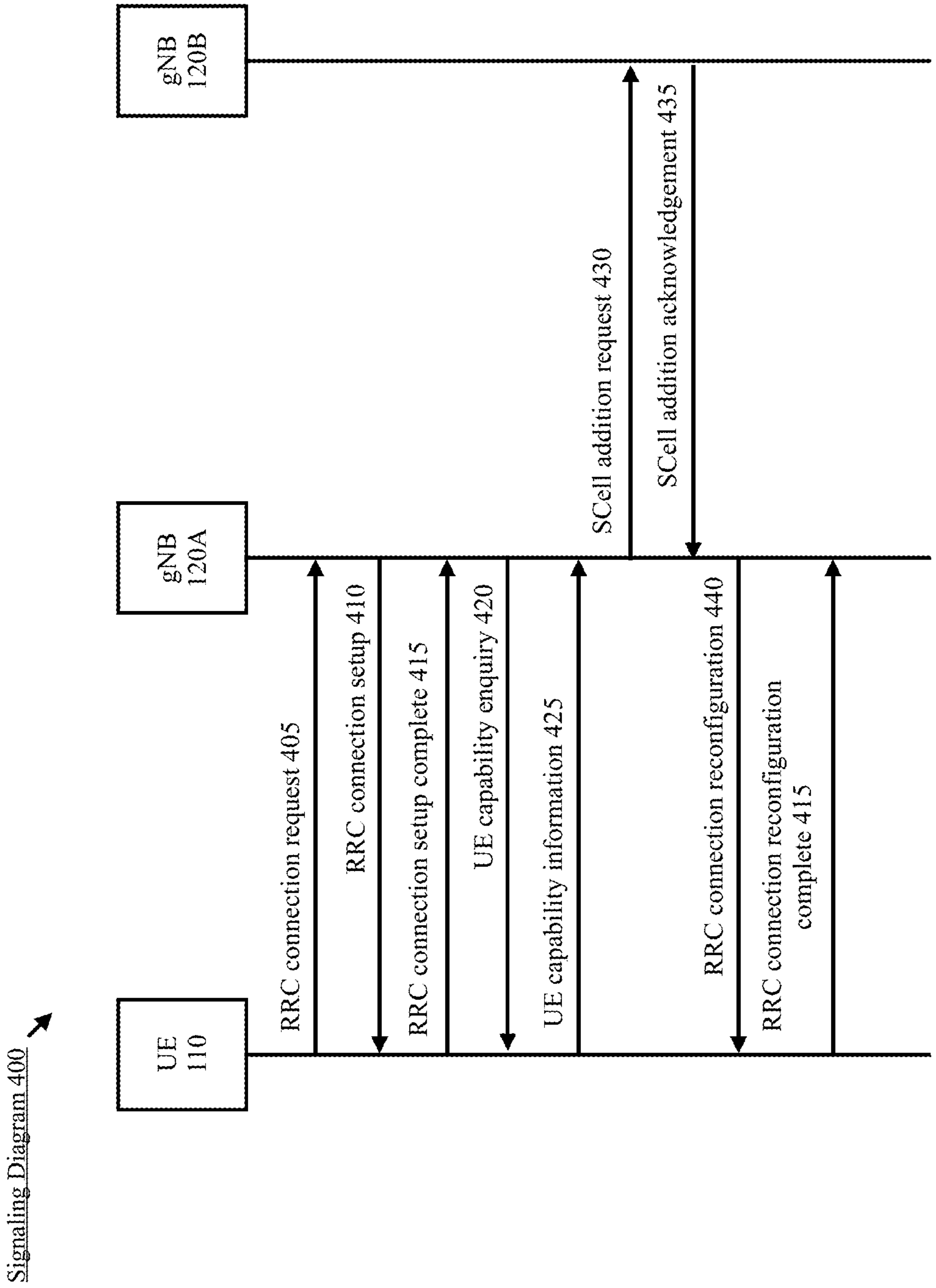
FIG. 4 shows a signaling diagram that relates to configuring the UE with a network connection that includes carrier aggregation (CA) according to various exemplary embodiments.

FIG. 4 shows a signaling diagram 400 that relates to configuring the UE 110 with a network connection that includes CA according to various exemplary embodiments. The signaling diagram 400 will be described with regard to network arrangement 100 of FIG. 1 and the UE 110 of FIG. 2.

The signaling diagram 400 includes the UE 110, the gNB 120A and the gNB 120B. Initially, consider the following exemplary scenario, the UE is camped on the gNB 120A of the 5G NR-RAN 120 and is in a radio resource control (RRC) idle state.

In 405, the UE 110 transmits an RRC connection request to the gNB 120A. This request may be how the UE 110 initiates the transition of being camped on a cell in an RRC idle state to being camped on the cell in an RRC connected state.

In 410, the gNB 120A transmits an RRC connection setup message to the UE 110. This message may be how the network provides the UE 110 with various parameters and metrics that may be used to establish the RRC connection between the UE 110 and the gNB 120A.

In 415, the UE 110 transmits an RRC connection setup complete message to the gNB 120A. This message may indicate to the gNB 120A that the UE 110 was able to successfully establish an RRC connection with the gNB 120A. Subsequently, various signaling may occur between the UE 110, the gNB 120A and various network entities to establish various bearers and access to the full scope of services normally available to the UE 110 via the network connection.

In 420, the gNB 120A may transmit a UE capability enquiry message to the UE 110. This message may request the UE 110 to compile and transmit a message that includes various radio access capabilities of the UE 110. As mentioned above, the exemplary embodiments relate to the UE 110 indicating to the network UE capabilities corresponding to supported CC numbers with regard to PDCCH monitoring and reduced PDCCH monitoring. In some embodiments, these capabilities may be explicitly requested by the network. In other embodiments, these capabilities may be implicitly requested.

In 425, the UE 110 transmits UE capability information to the gNB 120A. In this exemplary scenario, the UE capability information includes indications of UE capabilities related to supported CC numbers with regard to PDCCH monitoring and reduced PDCCH monitoring. Specific examples of this type of capability information will be described in detail below. The signaling diagram 400 is merely intended to provide a general example of a scenario in which the UE 110 may transmit UE capability information to the network.

In 430, gNB 120A sends a secondary cell (SCell) addition request to the gNB 120B to serve as the SCell for the UE 110. The SCell addition request to the gNB 120B may include information related to aspects of the network connection, such as, but not limited to, RRC configuration, bearer configuration, UE capability information, security information, etc. The network may configure the UE 110 with CA for any appropriate reason. For example, the network may be triggered to configure the UE 110 with CA based on factors such as, but not limited to, throughput requirements for the UE 110, signal quality corresponding to the UE 110 network connection, the network architecture (e.g., location of the gNB 120B) relative to the gNB 120A, network load, etc.

The network may select a particular cell as the SCell because that cell may operate in a manner that the UE 110 is capable of supporting. To provide a general example, the cell may utilize a span pattern for the PDCCH that the UE 110 has indicated that it supports. Thus, the capability information may, at least in part, provide the basis for the network to select a SCell for the UE 110.

In 435, the gNB 120B sends a SCell addition acknowledgement to the gNB 120A. This acknowledgement may also be sent via the communication interface between the cells and in accordance with the corresponding communication protocol. The acknowledgement may include information related to establishing a connection between the UE 110 and the gNB 120B, such as but not limited to, radio resources that may be assigned to the UE 110, radio bearers, RRC configuration messages, etc.

In 440, the gNB 120A sends an RRC connection reconfiguration message to the UE 110. The RRC connection reconfiguration message may include information, such as but not limited to, radio resources to be assigned to the UE 110, radio bearers, cell identities, timers and thresholds related to the network connection, etc.

In 445, the UE 110 sends the gNB 120A an RRC connection reconfiguration complete message. This message indicates to the gNB 120A that the RRC connection reconfiguration has been successfully completed.

Subsequently, the UE 110 may synchronize with the gNB 120B based on information received from the gNB 120A. The UE 110 may then use the gNB 120A for the first portion of the bandwidth being used for communications with the network and the gNB 120B for the second portion of the bandwidth being used for communications with the network, e.g., CA.

As mentioned above, the signaling diagram 400 is not intended to limit the exemplary embodiments in any way. Instead, the signaling diagram 400 provides a general example of a scenario in which the UE 110 may provide capability information to the network. Thus, any reference to a particular type of message (e.g., UE capability enquiry) is merely provided for illustrative purposes. Different entities may refer to a similar concept by a different name. The exemplary UE capability signaling described herein may be triggered by any appropriate condition or request and may be used in any appropriate scenario.

The following exemplary embodiments relate to UE capability signaling for supported CC numbers with regard to PDCCH monitoring. In some embodiments, UE capability information may include information that relates to different span configurations. A set of CCs (e.g., a band combination) may be characterized by a span configuration. The span configuration may indicate the one or more span patterns associated with a band combination. The span configuration {2,2} indicates that each of the CCs in a band combination is associated with a {2,2} span pattern. The span configuration {4,3} indicates that each of the CCs in a band combination is associated with a {4,3} span pattern. The span configuration {7,3} indicates that each of the CCs in a band combination is associated with a {7,3} span pattern. The span configuration {2,2}+{4,3} indicates that one or more of the CCs in a band combination is associated with a {2,2} span pattern and one or more of the CCs in the same band combination is associated with a {4,3} span pattern. The span configuration {2,2}+{7,3} indicates that one or more of the CCs in a band combination is associated with a {2,2} span pattern and one or more of the CCs in the same band combination is associated with a {7,3} span pattern. The span configuration {4,3}+{7,3} indicates that one or more of the CCs in a band combination is associated with a {4,3} span pattern and one or more of the CCs in the same band combination is associated with a {7,3} span pattern. The span configuration {2,2}+{4,3}+{7,3} indicates that one or more of the CCs in a band combination is associated with a {2,2} span pattern, one or more of the CCs in the same band combination is associated with a {4,3} span pattern and one or more of the CCs in the same band combination is associated with a {7,3} span pattern.

The above examples of span configurations are merely provided for illustrated purposes, the exemplary embodiments may apply to capability information for a set of CCs that includes any combination of one or more span patterns. Further, throughout this description, the terms "span configuration" and "span combination" may be used interchangeably.

The UE capability information may include an indication of the type of span configurations supported by the UE 110. Further, for each span configuration, a maximum number of downlink CCs for PDCCH monitoring may be indicated. For example, span configuration {2,2} may be associated with an integer (n) (or any other appropriate value) that identifies the maximum number of downlink CCs for PDCCH monitoring with span configuration {2,2}. Thus, the UE 110 may be capable of PDCCH monitoring up to (n) CCs when each of the (n) CCs are associated with a {2,2} span pattern.

To provide another example, span configuration {2,2}+{4,3} may be associated with a sequence of integers. A first integer (m) identifies the maximum number of downlink CCs for PDCCH monitoring for a first span pattern of the span configuration (e.g., {2,2} or {4,3}) and a second integer (p) identifies the maximum number of downlink CCs for PDDCH for a second span pattern of the span configuration. Thus, the UE 110 may be capable of PDCCH monitoring up to (m) CCs associated with a {2,2} span pattern and up to (p) CCs associated with a {4,3} span pattern for span configuration {2,2}+{4,3}. Each span configuration may be associated with its own respective maximum number of CCs.

Figure 5:
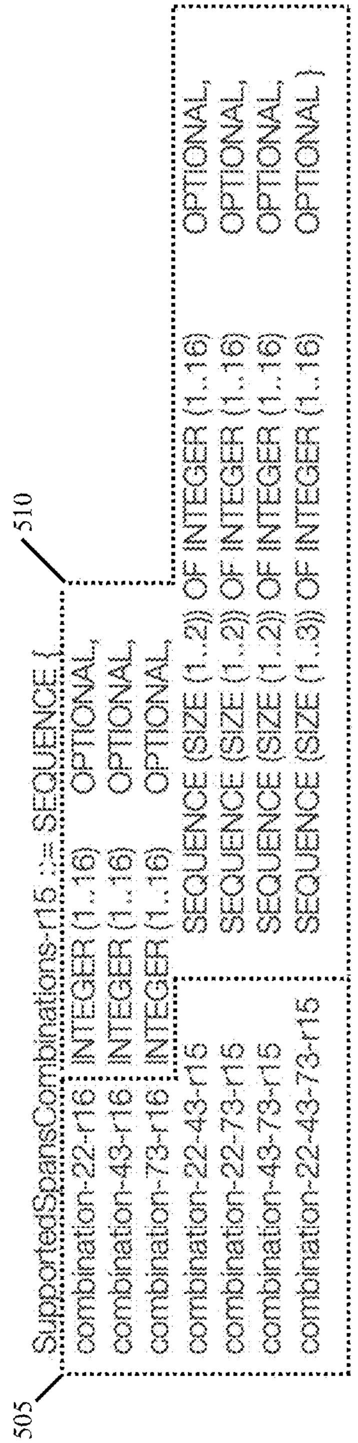
FIG. 5 illustrates an exemplary representation of UE capability information that relates to different span configurations.

FIG. 5 illustrates an exemplary representation of UE capability information that relates to different span configurations. In this example, "supported spans combinations" indicates that PDCCH monitoring for one or more span configurations is supported. Each entry included in portion 505 represents a different span configuration. For example, "combination-22-r16" may indicate that PDCCH monitoring is supported for span configuration {2,2} when operating in accordance with Rel-16. Similarly, "combination-22-43-r15" may indicate that PDCCH monitoring is supported for span configuration {2,2}+{4,3} when operating in accordance with Rel-15. The remaining combinations identified in portion 505 may be characterized in a similar manner.

Each entry in portion 510 represents a maximum number of downlink CCs for PDCCH monitoring that may be supported for a corresponding span configuration or a combination of span configurations included in portion 505. For example, "combination-22-r16" in portion 505 may be associated with an integer in portion 510 that identifies a maximum number of downlink CCs supported for that span configuration. Similarly, "combination-22-43-r15" in portion 505 may be associated with a sequence of integers in 510, where a first integer is associated with one of the span patterns included in the span configuration (e.g., {2,2} or {4,3}) and a second integer is associated with the other one of the span patterns included in the span configuration.

As mentioned above, the UE capability information may include an indication of the type of span configurations supported by the UE 110 and a corresponding maximum CC value. In some embodiments, to limit the number of CCs supporting Rel-16 span based PDCCH monitoring, the UE 110 may limit support of span configurations to span configurations that include up to (X) span patterns. For example, if X=1, the UE 110 may only indicate support for span configurations that include one span pattern (e.g., span configuration {2,2}, span configuration {4,3}, span configuration {7,3}, etc.) in the capability report. If X=2, the UE 110 may only indicate support for span configurations that include two or less span patterns (e.g., span configuration {2,2}, span configuration {4,3}, span configuration {7,3}, span configuration {2,2}+{4,3}, span configuration {2,2}+{7,3}, span configuration {4,3}+{7,3}, etc.) in the capability report. In another embodiments, only a single type of span based configuration may be supported within a physical uplink control channel (PUCCH) group in addition to Rel-15 PDCCH monitoring configuration. In other embodiments, the UE 110 may report a maximum number of supported CCs for Rel-16 span based monitoring configuration which is independent of the span configurations.

In further embodiments, the UE 110 may report a capability to monitor PDCCH according to one or more of the span patterns on a per SCS configuration basis. For example, the UE 110 may report support of one or more span patterns on a first SCS configuration (e.g., 15 kilo Hertz (kHz), 30 kHz, 60 kHz), support of a second one or more span patterns on a second SCS configuration, etc.

In other embodiments, the UE 110 may be configured with Rel-15 PDCCH monitoring only, Rel-16 PDCCH monitoring only, or both Rel-15 PDCCH monitoring configuration and Rel-16 PDCCH monitoring configuration simultaneously. For each of these configurations the UE 110 may report an independent maximum number of supported CCs. For example, the UE 110 may report a first maximum number of supported CCs for PDCCH monitoring when only Rel-15 PDCCH monitoring is to be used. The UE 110 may report a second maximum number of supported CCs for PDCCH monitoring when only Rel-16 PDCCH monitoring is to be used. In other embodiments, the UE 110 may report a maximum number of CCs which consists of X1 CCs with Rel-15 PDCCH monitoring configuration and X2=X−X1 CCs with Rel-16 PDCCH monitoring configurations.

The UE 110 is not expected to be configured with Rel-15 PDCCH monitoring and Rel-16 PDCCH monitoring configuration simultaneously for different CCs if only the first maximum number of supported CCs for the Rel-15 PDCCH only use case and/or the second maximum number of support CCs for the Rel-16 PDCCH only use case are reported. In other words, the UE 110 may be configured for either Rel-15 or Rel-16 PDCCH monitoring configuration for all CCs if only the first maximum number of supported CCs for the Rel-15 PDCCH only use case and/or the second maximum number of support CCs for the Rel-16 PDCCH only use case are reported.

The following exemplary embodiments relate to UE capability signaling for reduced PDCCH monitoring. This generally relates to the concept that the UE 110 may indicate to the network that the UE 110 is configured with relaxed PDCCH blind decoding capabilities for a given number of simultaneously supports CCs.

In one embodiment, the UE 110 may indicate separate PDCCH blind decoding capabilities for each indicated span pattern. During operation, the UE may include a list of span configurations may be indicated to the network in the UE capability information. This list may be referred to as "PDCCH-BlindDetectionSpan." Each span configuration included in the list may be associated with its own maximum supported CC number. For example, the list may include an indication of span configuration {2,2}, span configuration {4,3} and span configuration {7,3}. Each span configuration may be associated with an integer (or any other appropriate value) that indicates the supported CC number to calculate the PDCCH candidates for span configuration. The total number of all spans including Rel-15 PDCCH monitoring configuration included in the list may not be smaller than a predefined value.

In another embodiment, the UE 110 may be capable of relaxed blind decoding for Rel-15 PDCCH monitoring. However, this capability may not be applicable to Rel-16 PDCCH monitoring. Thus, the UE 110 may include an indication of blind decoding capabilities for Rel-15 PDCCH monitoring and an integer (or any other appropriate value) that indicates the supported CC number to calculate the PDCCH candidates. Since this capability may not be applicable to Rel-16 PDCCH monitoring, capability information for relaxed blind decoding Rel-16 PDCCH monitoring capabilities may not be included.

In a further embodiment, a set of scaling factors may be defined to allow the UE 110 to indicate an equivalent CC number. The scaling factors may be used on the network side to calculate the PDCCH candidates and non-overlapped CCEs. In some embodiments, a common scaling factor may be used for all span configurations. In other embodiments, separate scaling factors may be reported on a per span configuration basis.

To provide an example, the following formula may be used to compute the PDCCH candidates and non-overlapped CCEs using an equivalent CC number. The formula may be represented by:

$$C_{s(i)} = \text{round}\left(a_{s(i)} \times C_{s(i)}^{full}\right).$$

Here, $a_{s(i)}$ is the scaling factor for span i signaled by the UE 110 in the UE capability information and i represents the span index.

$$C_{s(i)}^{full}$$

may represent the number of supported CCs.

In another embodiment, the UE 110 may be configured with relaxed blind decoding for Rel-15 PDCCH monitoring only, relaxed blind decoding for Rel-16 PDCCH monitoring only, or relaxed blind decoding for both Rel-15 PDCCH monitoring configuration and Rel-16 PDCCH monitoring configuration simultaneously. Thus, different CC thresholds may be specified for reporting the relaxed PDCCH monitoring capabilities for Rel-15 and Rel-16 PDCCH monitoring configuration.

In one embodiment, the UE 110 may include the reduced number of CCs ($Z_1$) in the capability report for computation of span-based maximum number of PDCCH candidates and maximum number of non-overlapped CCEs that the UE 110 may monitor per span pattern when the UE 110 is capable of CA operation over more than X downlink cells. Similarly, the UE 110 may include the reduced number of CCs ($Z_2$) in the capability report for computation of span-based maximum number of PDCCH candidates and maximum number of non-overlapped CCEs that the UE 110 may monitor per span pattern when the UE 110 is capable of CA operation over more than Y downlink cells. In some embodiments, X≤Y due to more stringent PDCCH monitoring requirements for Rel-16 span-based PDCCH monitoring that that of Rel-15 slot-based PDCCH monitoring. In another embodiment, $$Z_1^{min} + Z_2^{min} \leq k, \text{ wherein } Z_1^{min}$$

is the minimum value of $Z_1$ and $$Z_2^{min}$$

is the minimum value of $Z_2$ and k=4.

EXAMPLES

A method performed by a next generation nodeB (gnB). The method includes sending, to a user equipment (UE), a request for radio access capabilities of the UE, receiving, from the UE, a message that includes one or more radio access capabilities of the UE, wherein the one or more radio access capabilities are related to a supported number of component carriers (CCs) for physical downlink control channel (PDCCH) monitoring by the UE.

The method described above, wherein the message includes an indication of one or more span configurations supported by the UE for PDDCH monitoring.

Any of the methods described above, wherein each of the one or more span configurations is associated with a maximum number of CCs.

Any of the methods described above, wherein the UE limits the one or more span configurations included in the message based on predetermined number of span patterns.

Any of the methods described above, wherein the one or more span configurations includes a single span configuration corresponding to a physical uplink control channel group for a first operating criteria.

Any of the methods described above, wherein the message includes one or more subcarrier spacing (SCS) configurations, each of the SCS configurations associated with one or more span patterns.

Any of the methods described above, wherein the message includes a maximum number of CCs for PDCCH monitoring in accordance with only a first operating criteria.

Any of the methods described above, wherein the message further indicates a first maximum number of CCs and a second maximum number of CCs for PDCCH monitoring in accordance with both the first operating criteria and a second operating criteria.

Any of the methods described above, wherein the first operating criteria is the third generation partnership program (3GPP) specification release 15 and the second operating criteria is the 3GPP specification release 16.

A next generation nodeB (gnB) configured to perform any of the methods described above.

An integrated circuit configured to perform any of the methods described above.

A computer readable storage medium storing instructions, that when executed cause a baseband processor of a next generation nodeB (gnB) to perform any of the methods described above.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:

at a user equipment (UE):

receiving a request from a network for radio access capabilities of the UE;

determining one or more radio access capabilities related to a supported number of component carriers (CCs) for physical downlink control channel (PDCCH) monitoring by the UE, wherein the one or more radio access capabilities include multiple span configurations and a maximum number of downlink CCs for PDCCH monitoring for each span configuration of the multiple span configurations;

generating a message that includes the one or more radio access capabilities of the UE, wherein the message further includes multiple entries, each entry corresponding to one of the multiple span configurations supported by the UE for PDCCH monitoring and a parameter explicitly identifying a maximum number of downlink CCs per span configuration for PDCCH monitoring, wherein each span configuration includes a single span configuration corresponding to a physical uplink control channel group for a first operating criteria; and transmitting the message to the network.

2. The method of claim 1, wherein the UE limits each span configuration included in the message based on a predetermined number of span patterns.

3. The method of claim 1, wherein the message includes one or more subcarrier spacing (SCS) configurations, each of the SCS configurations associated with one or more span patterns.

4. The method of claim 1, wherein the message includes a maximum number of CCs for PDCCH monitoring in accordance with only a first operating criteria.

5. The method of claim 4, wherein the message further indicates a first maximum number of CCs and a second maximum number of CCs for PDCCH monitoring in accordance with both the first operating criteria and a second operating criteria.

6. The method of claim 5, wherein the first operating criteria is the third generation partnership program (3GPP) specification release 15 and the second operating criteria is the 3GPP specification release 16.

7. A user equipment (UE), comprising:

a transceiver configured to communicate with a network; and a processor configured to perform operations, the operations comprising:

receiving a request from a network for radio access capabilities of the UE;

determining one or more radio access capabilities related to a supported number of component carriers (CCs) for physical downlink control channel (PDCCH) monitoring by the UE, wherein the one or more radio access capabilities include multiple span configurations and a maximum number of downlink CCs for PDCCH monitoring for each span configuration of the multiple span configurations;

generating a message that includes the one or more radio access capabilities of the UE, wherein the message further includes multiple entries, each entry corresponding to one of the multiple span configurations supported by the UE for PDCCH monitoring and a parameter explicitly identifying a maximum number of downlink CCs per span configuration for PDCCH monitoring, wherein each span configuration includes a single span configuration corresponding to a physical uplink control channel group for a first operating criteria; and transmitting the message to the network.

8. The UE of claim 7, wherein the UE limits each span configuration included in the message based on a predetermined number of span patterns.

9. The UE of claim 7, wherein the message includes one or more subcarrier spacing (SCS) configurations, each of the SCS configurations associated with one or more span patterns.

10. An integrated circuit, comprising:

circuitry configured to receive a request from a network for radio access capabilities of a user equipment (UE);

circuitry configured to determine one or more radio access capabilities related to a supported number of component carriers (CCs) for physical downlink control channel (PDCCH) monitoring by the UE, wherein the one or more radio access capabilities include multiple span configurations and a maximum number of downlink CCs for PDCCH monitoring for each span configuration of the multiple span configurations;

circuitry configured to generate a message that includes the one or more radio access capabilities of the UE, wherein the message further includes multiple entries, each entry corresponding to one of the multiple span configurations supported by the UE for PDCCH monitoring and a parameter explicitly identifying a maximum number of downlink CCs per span configuration for PDCCH monitoring, wherein each span configuration includes a single span configuration corresponding to a physical uplink control channel group for a first operating criteria; and circuitry configured to transmit the message to the network.

11. The integrated circuit of claim 10, wherein the UE limits each span configuration included in the message based on a predetermined number of span patterns.

12. The integrated circuit of claim 10, wherein the message includes one or more subcarrier spacing (SCS) configurations, each of the SCS configurations associated with one or more span patterns.

13. The UE of claim 7, wherein the message includes a maximum number of CCs for PDCCH monitoring in accordance with only a first operating criteria.

14. The UE of claim 13, wherein the message further indicates a first maximum number of CCs and a second maximum number of CCs for PDCCH monitoring in accordance with both the first operating criteria and a second operating criteria.

15. The UE of claim 14, wherein the first operating criteria is the third generation partnership program (3GPP) specification release 15 and the second operating criteria is the 3GPP specification release 16.

16. The integrated circuit of claim 10, wherein the message includes a maximum number of CCs for PDCCH monitoring in accordance with only a first operating criteria.

17. The integrated circuit of claim 16, wherein the message further indicates a first maximum number of CCs and a second maximum number of CCs for PDCCH monitoring in accordance with both the first operating criteria and a second operating criteria.

18. The integrated circuit of claim 17, wherein the first operating criteria is the third generation partnership program (3GPP) specification release 15 and the second operating criteria is the 3GPP specification release 16.

* * * * *